United States Patent [19]
Kida et al.

[11] Patent Number: 5,564,842
[45] Date of Patent: Oct. 15, 1996

[54] RECORDING APPARATUS

[75] Inventors: Shigeru Kida; Katsuyuki Sakai; Masaya Kawatsuri, all of Nara-ken; Manabu Sakata, Hiroshima-ken, all of Japan

[73] Assignee: Sharp Kabushiki Kaisha, Osaka, Japan

[21] Appl. No.: 84,063

[22] Filed: Jun. 30, 1993

[30] Foreign Application Priority Data

Jul. 3, 1992 [JP] Japan ................................. 4-177185
Nov. 5, 1992 [JP] Japan ................................. 4-295927

[51] Int. Cl.⁶ ...................................... B41J 11/50
[52] U.S. Cl. ..................... 400/185; 400/629; 400/605
[58] Field of Search ..................... 400/624, 625, 400/629, 120.16, 120.17, 185, 605; 271/9

[56] References Cited

U.S. PATENT DOCUMENTS

| 4,796,035 | 1/1989 | Kawasaki et al. | 346/108 |
| 4,866,531 | 9/1989 | Kobori et al. | 358/400 |

FOREIGN PATENT DOCUMENTS

| 0439400 | 1/1991 | European Pat. Off. . |
| 0505969 | 9/1992 | European Pat. Off. . |
| 4022883 | 2/1991 | Germany . |
| 1-54905 | of 1989 | Japan . |
| 2-231861 | of 1990 | Japan . |
| 2-264559 | of 1990 | Japan . |

OTHER PUBLICATIONS

Patent Abstracts of Japan, vol. 15, No. 441 (M–1177) Nov. 11, 1991, & JP–A–31 86 536.

*Primary Examiner*—David A. Wiecking
*Attorney, Agent, or Firm*—Nixon & Vanderhye P.C.

[57] ABSTRACT

A recording apparatus includes a roll of recording paper, a roll conveying roller for feeding a roll of recording paper, and a sheet conveying roller for feeding sheets of recording paper. Power from a DC motor is transmitted to both rollers through a switching mechanism. The switching mechanism includes a system gear, a planetary gear, and a planetary gear arm, and a locking member for fixing the planetary gear arm at a prescribed position. A head release cam, a head release pulley, and a timing belt cooperate with the switching mechanism to remove pressure from a print recording head to prevent damage to the head during switching. Accordingly, a roll of recording paper and sheets of recording paper can be selected and used as needed without increasing the manufacturing cost and size of the apparatus.

12 Claims, 13 Drawing Sheets

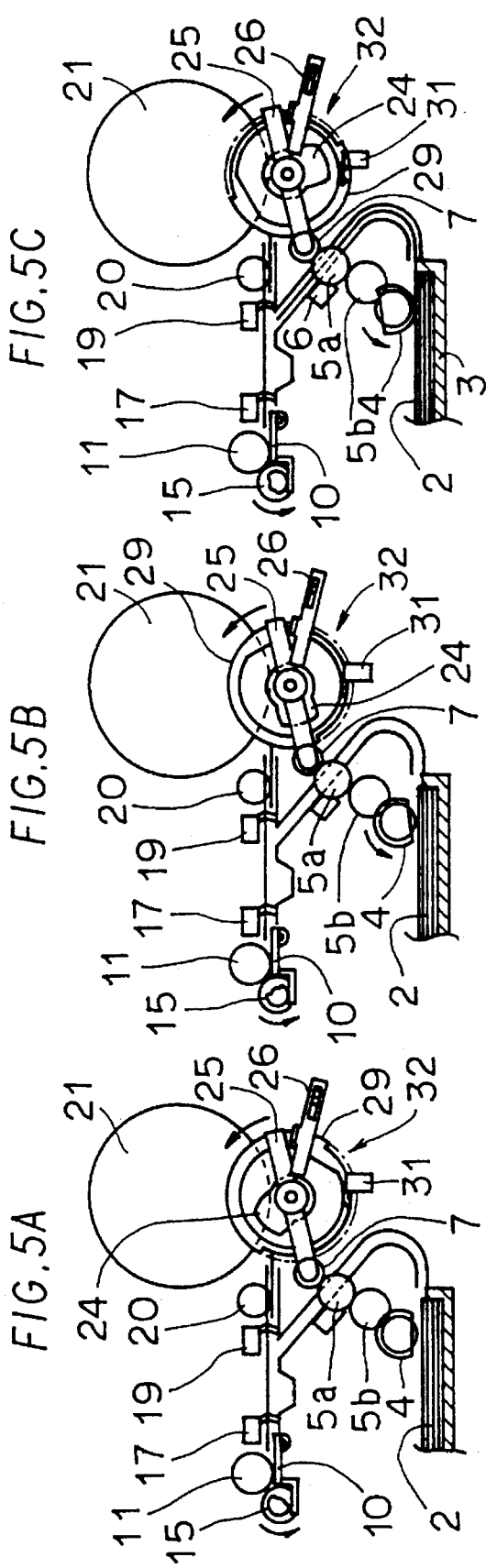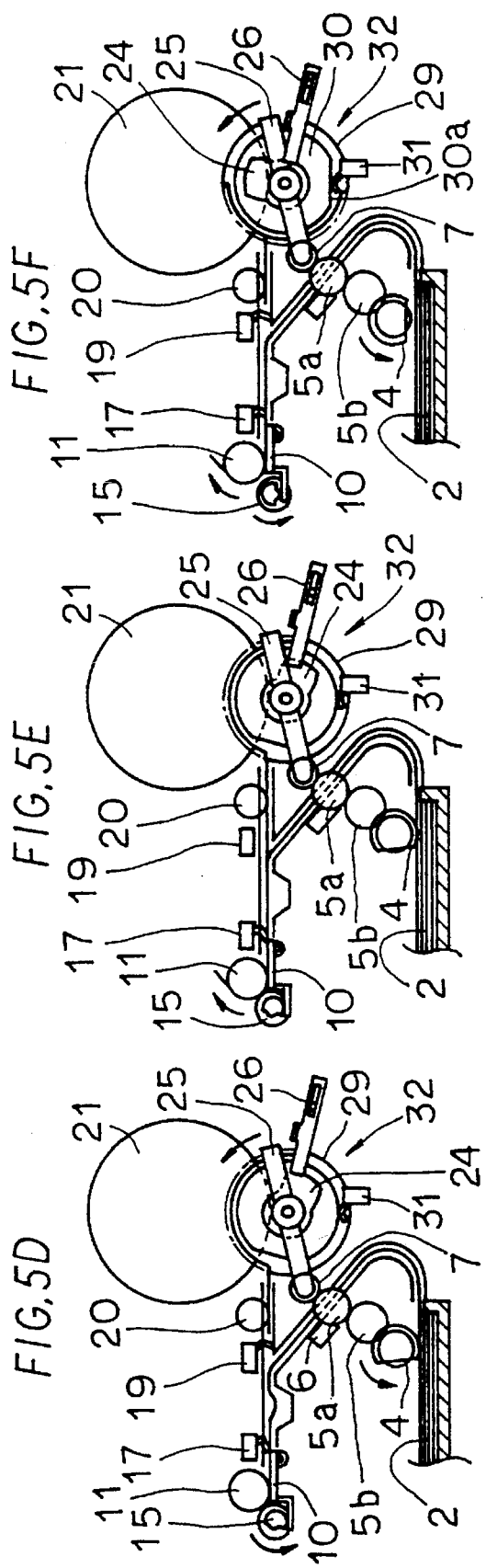

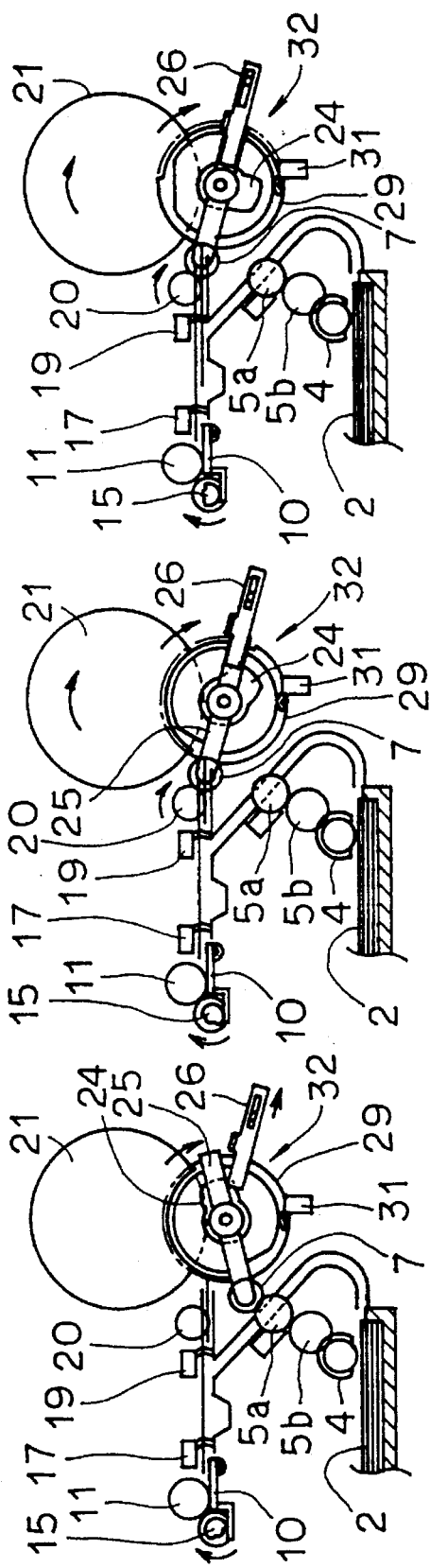

RECORDING APPARATUS

BACKGROUND OF THE INVENTION

1. Field of the Invention

The present invention relates generally to recording apparatuses such as facsimile machine, and more specifically, to a recording apparatus permitting selective use of recording paper in the form of roll and recording paper in the form of sheets as needed.

2. Description of the Related Art

Conventionally, a facsimile machine has been known as one example of a recording apparatus. The facsimile machine optically scans an original, converts the scanned data into an electrical signal for transmission, and conducts recording in response to a signal received at a receiver which is synchronously operated with the transmitter. A roll of recording paper and sheets of recording paper had been used as recording paper at the time of recording.

FIG. 12 is a view schematically showing the structure of one example of a facsimile machine using a roll of recording paper. FIG. 13 is a view schematically showing a structure of one example of a conventional facsimile machine using sheets of recording paper. Referring to FIG. 12, facsimile machine 101 includes read unit 102 for reading information to be transmitted, a roll of recording paper 104, a platen roller 105 for conveying the roll of recording paper, and a thermal head 106 for recording received information onto the roll of recording paper 104. At the time of transmission, an original 103 having transmission information is passed on read unit 102 for reading of the information, and the read information is transmitted. At the time of reception, the roll of recording paper 104 is fed by platen roller 105, and at that time received information is recorded on the roll of recording paper 104 using thermal head 106.

Now, referring to FIG. 13, a facsimile machine 107 using sheets of recording paper 111 includes a read unit 108, a thermal head 113, a platen roller 112, the sheets of recording paper 111, and a cassette for housing the sheet of recording paper 111. When received information is recorded, the sheets of recording paper 111 are conveyed by platen roller 112, and the received information is recorded using thermal head 113.

Such a facsimile machine using only a roll of recording paper or sheets of recording paper has the following disadvantages. When facsimile machine 101 using the roll of recording paper 104 is provided with a copying function, and used as a simple copier, an empty space is left at a lead end of the recording paper, and therefore the length of recording paper after being copied is longer than the original. The roll of recording paper 104 tends to roll after release. Therefore, a roll of recording paper suffers from inconvenience in filing after the copying.

Meanwhile, the facsimile machine 107 using sheets of recording paper has a disadvantage in recording received data. Received information is recorded together with a record of the transmitting party. Therefore, image data must be reduced for recording or data for one sheet must be recorded in two sheets. When image data is reduced, the recorded image is sometimes too small to read. When data for one sheet is divided into two sheets in recording, it will be necessary to join these two sheets of recording paper later, which results in waste of recording paper. Furthermore, when data far excess of the amount which can be recorded on a sheet of recording paper is received, a large number of RAMs must be provided for recording the data resulting in cost increase.

In view of the foregoing, a facsimile machine using a roll of recording paper in recording received data and sheets of recording paper in copying is disclosed in Japanese Patent Publication No. 1-54905. FIG. 12 is a view schematically showing the structure of the facsimile machine disclosed in Japanese Patent Publication No. 1-54905 which includes both a roll of recording paper and sheets of recording paper. It is noted that for ease of description, only the part necessary for the following description is set forth in FIG. 14, and the other part is omitted.

Referring to FIG. 14, facsimile machine 114 includes a reading portion 115 for reading information on an original surface, and a recording portion 116 for recording received information onto recording paper. Recording portion 116 includes sheets of recording paper for copying 117, a cassette 117a for housing the sheets of recording paper 117 and a paper feeding roller 118 for feeding sheets of recording paper 117 in the direction of a conveying path, a roll of recording paper 119, paper feeding rollers 120 for feeding the roll of recording paper 119 in the direction of the conveying path, a cutter 121 for cutting the roll of recording paper 119 into a prescribed length, holding rollers 122, guide plates 123, 124, timing rollers 125, a recording head 126, a presser plate 127, a guide nail 128, a solenoid 131 for operating the guide nail, a first discharge tray 129 for accommodating recording paper for copying, and a second discharge tray 130 for accommodating recording paper for facsimile reception.

In copying, a sheet of recording paper 117 is conveyed by paper feeding roller 118, the timing for the recording paper being adjusted by timing rollers 125, and then the sheet is conveyed to recording head 126. After information read by recording head 126 is recorded on the recording paper, the sheet of recording paper 117 is accommodated in the first discharge tray 129.

When received information is recorded, roll of recording paper 119 is used. The roll of recording paper 119 is conveyed by paper feeding rollers 120 and holding rollers 122, the timing for the recording paper is adjusted by timing roller 125, and then the sheet of recording paper is conveyed to recording head 126. After received information is recorded by recording head 126, the paper is cut into a prescribed length by cutter 121 and accommodated into second discharge tray 130.

As described above, facsimile machine 114 uses the roll of recording paper 119 for recording received information and the sheets of recording paper 117 for copying.

Facsimile machine 114 is still encounters with the following disadvantage. It is necessary to independently provide a power source for conveying the roll of recording paper 119 and a driving source for conveying the sheets of recording paper. More specifically, at least two power sources will be necessary for conveying recording paper. Therefore, extra space is necessary for accommodating these power sources and, manufacturing costs are increased.

In the above-described facsimile machine 114, received information is always recorded on the roll of recording paper 119. The roll of recording paper 119 however tends to roll after discharge and therefore it is desirable to use sheets of recording paper for the sake of filing convenience. Accordingly, as long as the amount of received data is within the amount which permits use of sheets of recording paper, it is desirable to record received information onto sheets of recording paper.

It is an object of the invention to provide a recording apparatus permitting reduction of the size of the machine and the manufacturing cost and selection of recording paper depending upon the amount of information received using a common power source for conveying roll of recording paper and sheets of recording paper.

SUMMARY OF THE INVENTION

A recording apparatus according to the invention, in one aspect includes a recording portion for recording an image on recording paper, a first paper feeding portion for feeding first recording paper to the recording portion, a second paper feeding portion for feeding second recording paper to the recording portion, a common power source for operating first and second paper feeding portions, and a switching mechanism for selectively transmitting driving force from the power source to the first paper feeding portion or the second paper feeding portion.

As described above, the recording apparatus according to the invention includes the switching mechanism for selectively transmitting driving force from the power source to the first paper feeding portion or the second paper feeding portion. Thus, the first and second paper feeding portions can be operated by a single power source. The first recording paper or second recording paper can be selected as needed.

The above-described first paper feeding portion includes a first driving force transmitted portion to which the driving force from the driving source is transmitted through the above-described switching mechanism, while the above-described second paper feeding portion includes a second driving force transmitted portion to which the driving force from the power source is transmitted through the above-described switching mechanism. The switching mechanism preferably includes a first gear to which the driving force is transmitted from the power source, a second gear for selectively transmitting the force transmitted to the first gear to the first driving force transmitted portion or the second driving force transmitted portion, and a holding member holding the second gear rotatably at the first gear for pivoting the second gear with rotation of the first gear, thereby moving the second gear to the first driving force transmitted portion or the second driving force transmitted portion.

As described above, the switching mechanism preferably includes the first gear, the second gear, and the holding member. The second gear is attached to the first gear through the holding member. Therefore, the holding member and second gear move with the rotation of the first gear. Thus, the second gear can be selectively moved to the first to driving force transmitted portion or the second driving force transmitted portion by the rotation of the first gear. Consequently, driving force from the common power source can selectively be transmitted to the first paper feeding portion or second paper feeding portion.

The recording apparatus according to the invention, in another aspect, includes a recording portion having a recording head for recording an image on recording paper, a first paper feeding portion for feeding first recording paper to the recording portion, a second paper feeding portion for feeding second recording paper to the recording portion, a common power source for operating the first and second paper feeding portions, a first gear for transmitting driving force from the power source, a second gear for selectively transmitting the driving force transmitted to the first gear to the first paper feeding portion or the second paper feeding portion, a holding member for holding the second gear rotatably at the first gear, and a cooperative operation portion for operating the first gear and the recording portion in cooperation, thereby moving the recording head.

As described above, the recording apparatus according to the invention, in another aspect, further includes the cooperative portion for operating the first gear and recording portion in cooperation, thereby moving the recording head. Thus, operation of the first gear permits the movement of the recording head together with the first gear. Thus, operation of the first gear permits the recording head to change its state from the state in which recording paper can be recorded to the state in which the recording paper cannot be recorded. More specifically, the recording head can be enabled to record only at the time of recording.

The recording apparatus according to the invention, in a still further aspect, includes a recording portion for recording an image on recording paper, a first paper feeding portion for feeding first recording paper to the recording portion, a second paper feeding portion for feeding second recording paper to the recording portion, a common power source for operating the first and second paper feeding portions, a first gear for transmitting driving force from the power source, a second gear for selectively transmitting the force transmitted to the first gear to the first paper feeding portion or to the second paper feeding portion, a holding member for holding the second gear rotatably to the first gear, and a holding member control portion for fixing the holding member to a first position for transmitting the driving source to the first paper feeding portion, or to a second position for transmitting the driving force to the second paper feeding portion.

As described above, the recording apparatus according to the invention additionally includes the holding member control portion. Thus, the holding member can be fixed to the first position for transmitting the driving force to the first paper feeding portion or to the second position for transmitting the driving force to the second paper feeding portion when the driving force is selectively transmitted to the first paper feeding portion or the second paper feeding portion.

A recording apparatus according to the invention, in a still further aspect, includes a first accommodation portion for accommodating first recording paper, a second accommodation portion for accommodating second recording paper, a recording portion for recording an image on recording paper, a first paper feeding portion for taking out the first recording paper from the first accommodation portion and feeding it to the recording portion, a second paper feeding portion for taking out the second recording paper from the second accommodation portion and feeding it to the recording portion, a common driving source for operating the first and second paper feeding portions, a switching mechanism for selectively transmitting driving force from the driving source to the first paper feeding portion or second paper feeding portion, a sensor for detection of whether or not the first recording paper still remains at the first accommodation portion, a control portion for making such a control that the switching mechanism is operated in response to the detection of the first recording paper not remaining at the first accommodation portion by the sensor and driving force from the power sources its transmitted to the second paper feeding portion.

A recording apparatus according to the invention, in a still further aspect, includes a sensor for detecting whether or not the first recording paper remaining at the first accommodation portion. Thus, whether or not the first recording paper is left at the first accommodation portion can be detected. The sense is connected to the control portion, and the switching mechanism is operated by the control portion in response to the detection of the first recording paper not remaining at the first accommodation portion by the sensor. As a result, the driving force from the power source is transmitted to the second paper feeding portion. Thus, if the first recording paper runs out, the second recording paper can automatically be fed to the recording portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A–5F are views showing 1st–6th stages in a switching operation from the neutral state to the state of feeding sheets of recording paper;

FIGS. 6A–6F are views showing 1st–6th stages in a switching operation from the neutral state to the state of feeding a roll of recording paper;

DESCRIPTION OF THE PREFERRED EMBODIMENTS

Now, a facsimile machine according to a first embodiment of the invention will be described in conjunction with FIGS. 1–9.

Figure 1:
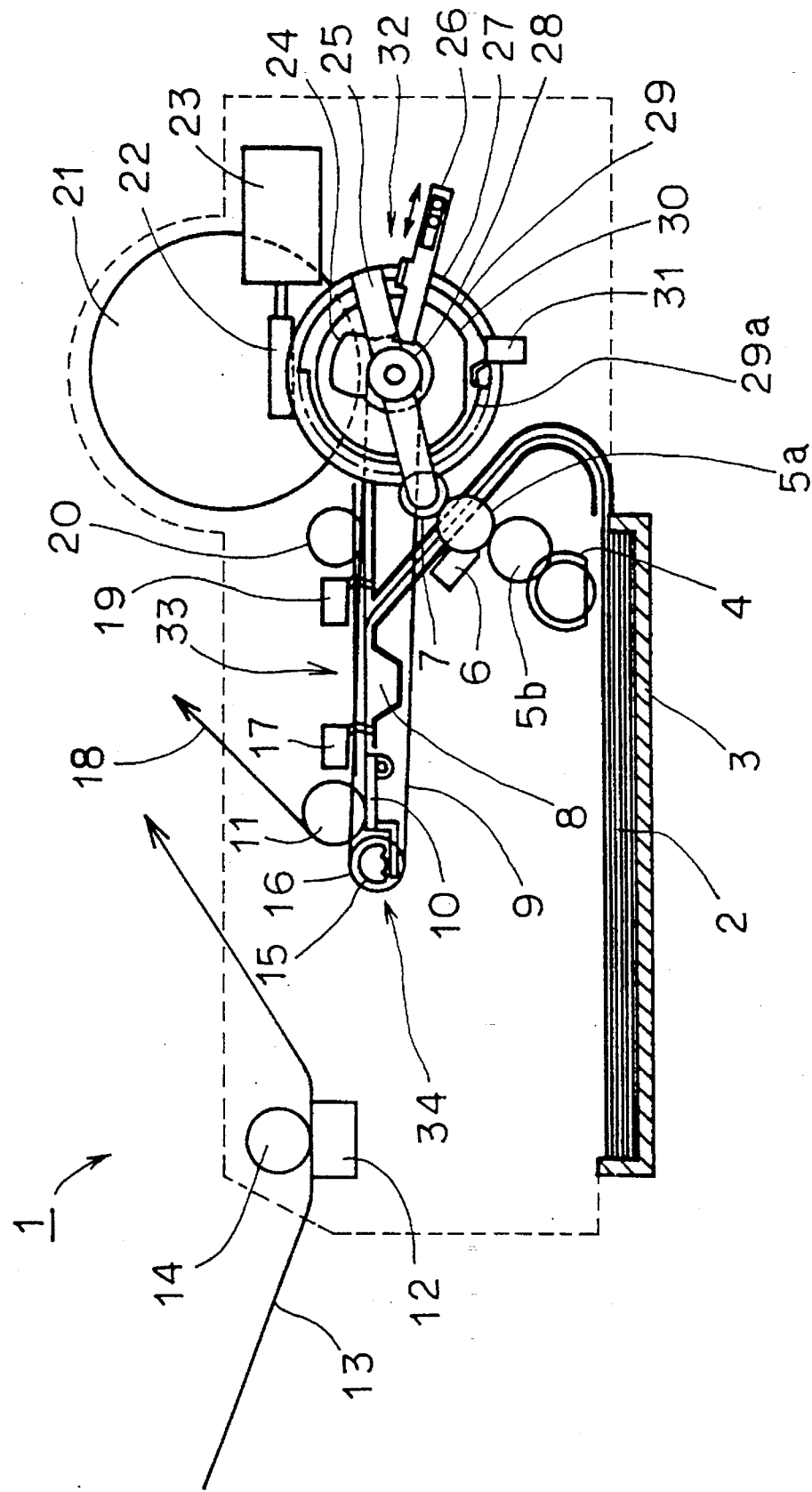
FIG. 1 is a view schematically showing the structure of a facsimile machine according to a first embodiment of the invention.
Figure 2:
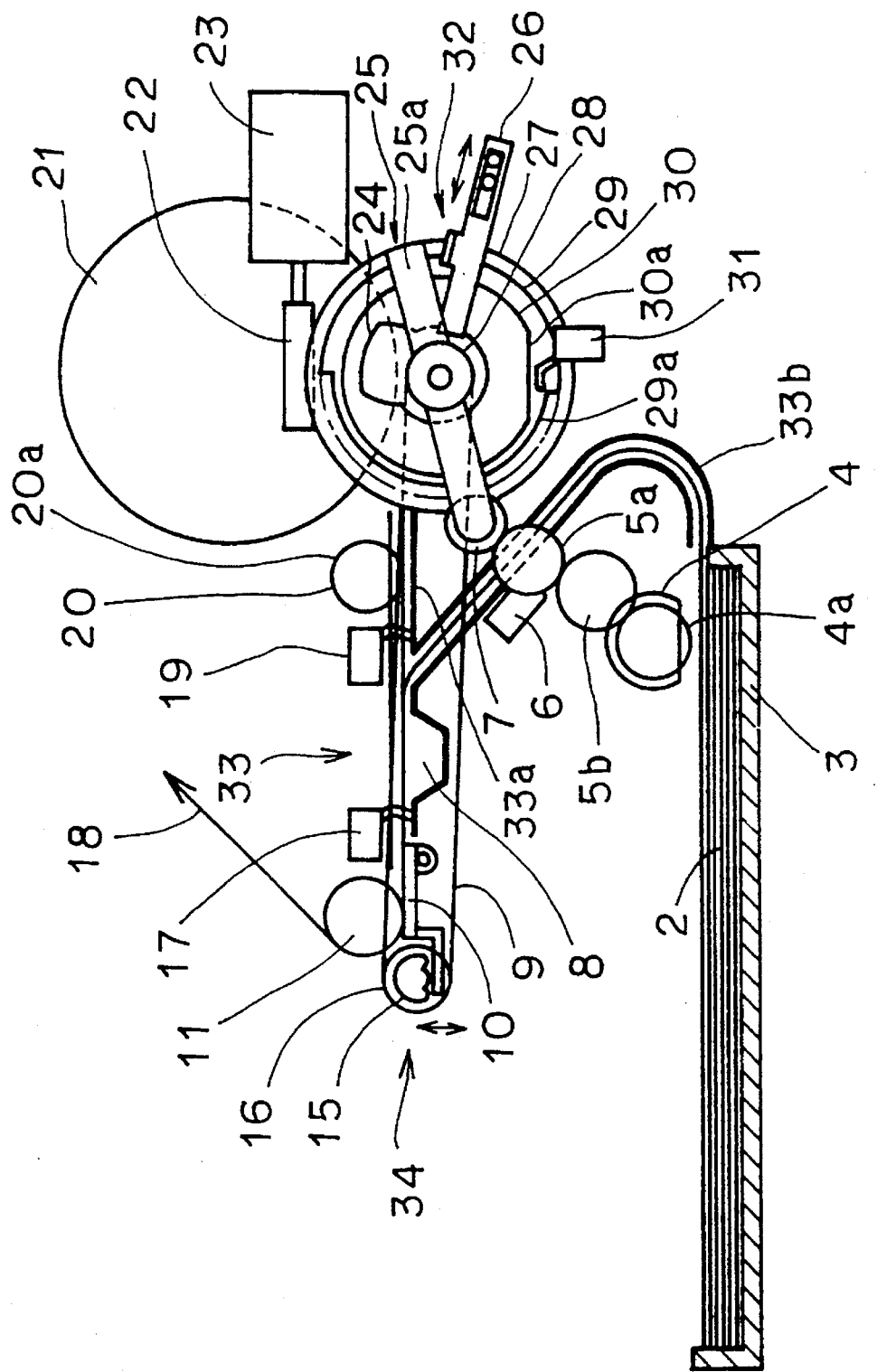
FIG. 2 is a view schematically showing the structure of a switching mechanism in the facsimile machine according to the first embodiment of the invention.

FIG. 1 is a view schematically showing the structure of the facsimile machine according to the first embodiment of the invention. FIG. 2 is a view showing the structure of the switching mechanism in FIG. 1. The drawings showing embodiments which will be described below do not show the part provided with a copying function. However, the switching mechanism according to the invention is useful regardless of the presence/absence of the copying function. Referring to FIG. 1, facsimile machine 1 includes a read unit 12 for reading transmitted information, a DC motor 23 as a power source for conveying recording paper, a system gear 32 constituting the essential part of the switching mechanism, a roll of recording paper 21, a roll of recording paper conveying rollers 20 for conveying the roll of recording paper 21, sheets of recording paper 2, a recording paper cassette 3 for accommodating the sheets of recording paper 2, a sheet of paper conveying roller 4 for conveying the sheets of recording paper 2, a first idler gear 5a for transmitting driving force to sheet of paper conveying roller 4, a second idler gear 5b, a conveying path 33 for conveying the sheets of recording paper 2 or the roll of recording paper 21, and a recording portion 34 for recording an image on recording paper.

An original conveying roller 14 for conveying an original 13 is provided at a position opposite to the reading surface of read units 12. The original 13 with transmitted information thereon is conveyed on the reading surface in read unit 12 by original conveying roller 14. Thus, reading of the received information is performed. DC motor 23 is provided with a worm gear 22 for driving a system gear 32. System gear 32 is driven by worm gear 22. A planetary gear arm 25 is rotatably provided on system gear 32. A planetary gear 7 is rotatably provided on one end of planetary gear arm 25 for selectively transmitting driving force to system gear 32 to roll recording paper conveying roller 20 or first idler gear 5a.

A lock member 26 controls the operation of planetary gear arm 25 in system gear 32. System gear 32 is further provided with a gear position detection sensor 31. System gear 32 itself is formed of a worm wheel 27, a head releasing drive pulley 28, a sun gear portion 29 and a gear position detection cam 30. A lock driving groove 24 for driving the above-described lock member 26 is provided inside system gear 32. A raised portion is provided at a prescribed position at the bottom of lock driving groove 24. Lock member 26 is driven along lock member driving groove 24. More specifically, lock 26 reciprocates in the direction of the diameter of system gear 32 by the rotation of lock driving groove 24 according to the rotation of system gear 32.

Recording paper conveying path 33 is so structured that a path for conveying the roll of recording paper 21 and a path for conveying the sheets of recording paper 2 are joined at a prescribed position. Roll conveying roller 20 is provided in the path of the roll of recording paper 21, and a roll recording paper sensor 19 is provided in the vicinity of the joining position of these conveying paths. Thus, it can be determined whether or not the roll paper 21 is in the vicinity of the joining position in the conveying path 33. Meanwhile, sheet paper conveying roller 4 is provided at a prescribed position with respect to the sheets of recording paper 2, and is connected with planetary gear 7 through first idler gear 5a and second idler gear 5b. A sheet of recording paper sensor 6 is provided at a prescribed position in the conveying path for sheets of recording paper 2. A recording paper storage 8, an A4 detection sensor 17, and a recording portion 34 are provided at the portions after the joining position of the sheets of recording paper conveying path and roll of recording paper conveying path.

Recording portion 34 includes a printing head 10, a head release cam 15, and a head release pulley 16. Head release pulley 16 is connected to head releasing driving pulley 28 through a timing belt 9. Thus, head release pulley 16 is rotated with the rotation of head releasing pulley 28 due to the rotation of system gear 32. Thus, head release cam 15 is rotated and the position of printing head 10 moves. A platen roller 11 is provided at a prescribed position opposite to printing head 10 in recording portion 34. Recording paper recorded with printed head 10 is conveyed by platen roller 11.

The switching mechanism in facsimile machine 1 will be described in more detail in conjunction with FIG. 2. Referring to FIG. 2, sun gear 29 in system gear 32 engages with planetary gear 7 to transmit force from system gear 32. A portion 29a having a diameter approximately identical to sun gear 29 is provided, which is not transmitted with the driving force, because it does not engage with planetary gear 7. More specifically, sun gear 29 rotates due to the rotation of system gear 32 and driving force is transmitted only when sun gear 29 and planetary gear 7 engage.

A recess 30a is provided on gear position detection cam 30, and detection of recess 30a using gear position detection sensor 31 permits detection of the initial position of the rotation of system gear 32. Lock member 26 is mated with lock driving groove 24 at the bottom surface of lock driving groove 24. Lock member 26 has a projection (not shown) on the side of system gear 32 (on the side of the contacting surface between lock member 26 and the bottom of lock driving groove 24). The projection is provided to extend in a direction crossing the upper surface 25a of planetary gear arm 25. Engagement of the projection with planetary gear arm 25 restricts the pivotal movement of planetary gear arm 25. The lock member 26, as indicated by arrow in FIG. 2, reciprocates in a direction toward system gear 32 or in a direction away from system gear 32. If, for example, system gear 32 rotates counterclockwise, planetary gear 7 engages with first idler gear 5a, but if lock member 26 is close to system gear 32, planetary gear arm 25 is prohibited from rotating clockwise by the above-described projection of lock member 26. More specifically, lock member 26 fixes, planetary gear arm 25 at a position where driving force can be transmitted to first idler gear 5a.

Accordingly, the driving force can be transmitted to sheet of recording paper conveying roller 4, and sheets of recording paper 2 can be fed to recording portion 34. Sheet paper conveying roller 4 includes a sheet of recording paper conveying gear 4a, and the driving force is transmitted to sheet paper conveying gear 4a from second idler gear 5b. This rotates sheet paper conveying roller 4. Meanwhile, a roll of recording paper conveying gear 20a is provided coaxially to roll of recording paper conveying roller 20 and the driving force from planetary gear 7 is transmitted to roll conveying gear 20a. As a result, roll conveying roller 20 is rotated, and the roll of recording paper 21 is fed to recording portion 34. As described above, recording head 10 in recording portion 34 is provided to operate together with head releasing drive pulley 28 in system gear 32, and in this case, it moves in the direction indicated by the arrow in the figure by the rotation of head release pulley 16and head release cam 15. Thus, pressure caused by printing head 10 upon platen roller 11 can be reduced or eliminated.

Figure 3A:
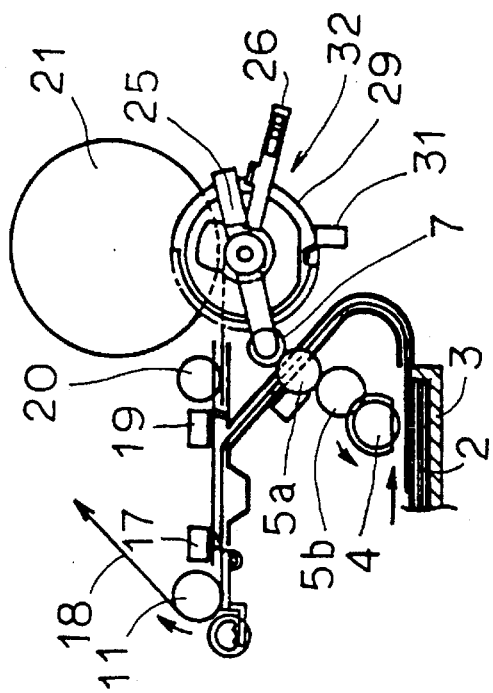
FIG. 3A is a view for use in illustration of how a roll of recording paper is fed in a facsimile machine according to the invention.

The operation of facsimile machine 1 having the above-described structure will be described in conjunction with FIGS. 3–9. FIG. 3A illustrates the state in which the roll of recording paper 21 can be fed, FIG. 3C the state in which sheets of recording paper 2 can be fed, and FIG. 3B the state of transition between the state of feeding roll of recording paper and the state of feeding sheets of recording paper.

Figure 3C:
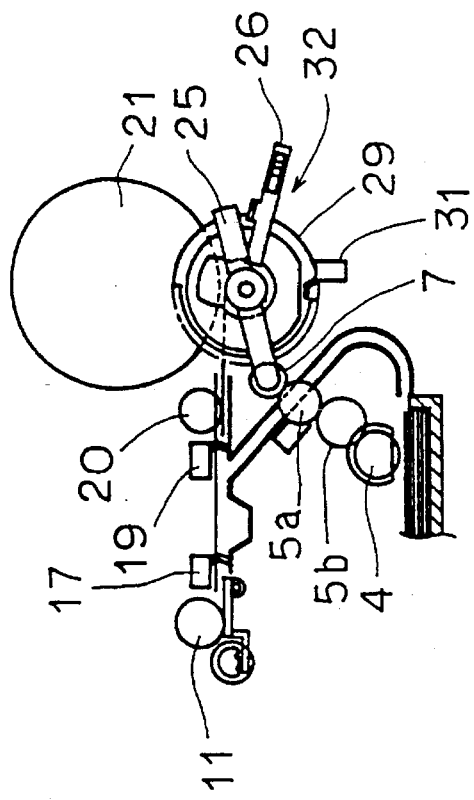
FIG. 3C is a view for use in illustration of how a sheet of recording paper is fed in a facsimile machine according to the invention.
Figure 3B:
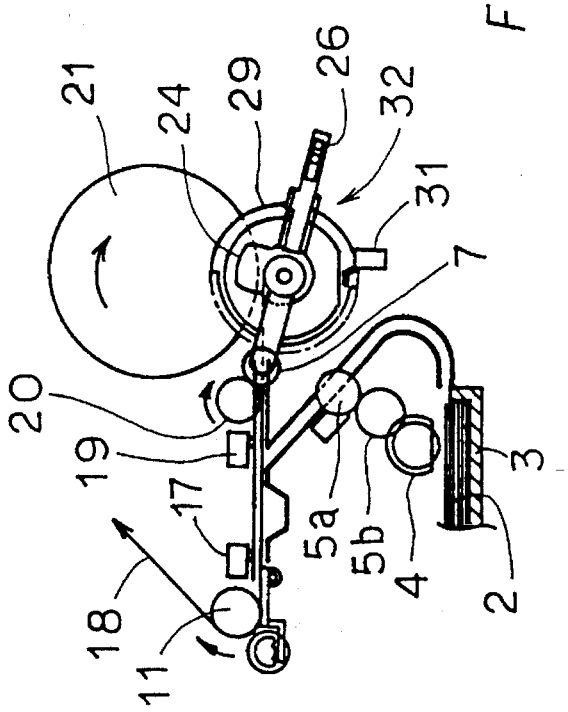
FIG. 3B is a view for use in illustration of a neutral state in a facsimile machine according to the invention.

Referring to FIGS. 3A–3C, the state of machine can be moved from the state of conveying the roll of recording paper 21 (FIG. 3A) to the neutral state (FIG. 3B) by rotating system gear 32 counterclockwise. Then, the state moves to the state of conveying sheets of recording paper 2 (FIG. 3C) by further rotating system gear 32 counterclockwise. When a transition is made from the state of feeding sheets of recording paper (FIG. 3C) to the state of feeding roll of recording paper (FIG. 3A), first the sheets of recording paper are discharged by platen roller 11. Then, the state is moved from the state of feeding sheets of recording paper (FIG. 3C) to the neutral state (FIG. 3B). Then, system gear 32 is rotated clockwise, and the state is moved from the neutral state (see FIG. 3B) to the state of feeding roll of recording paper (FIG. 3A).

Figure 7:
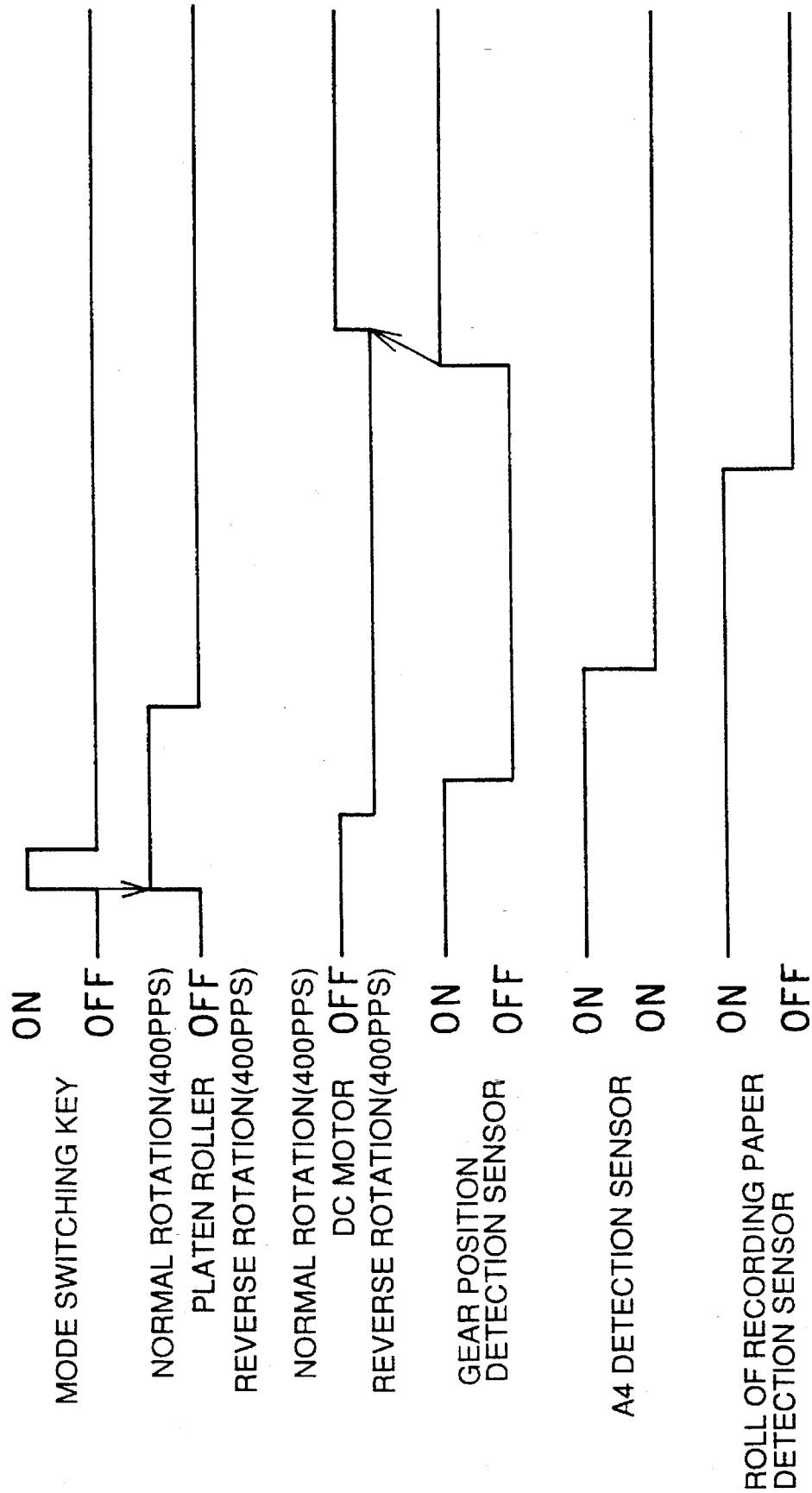
FIG. 7 is a timing chart for use in illustration of the switching operation shown in FIG. 4.

The above-described switching operation will be described in more detail in conjunction with FIGS. 4 to 9. FIGS. 4A–4F are views showing step by step the switching operation from the state of feeding roll of recording paper (FIG. 3A) to the neutral state (FIG. 3B). FIG. 7 is a timing chart when the above-described switching operation is made.

Figure 4A:
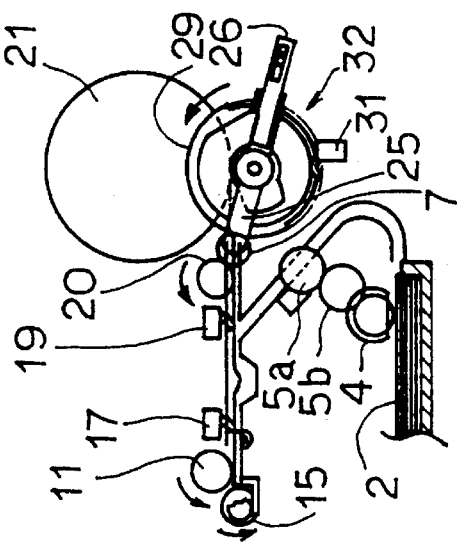
FIGS. 4A–4F are views showing 1st–6th stages in a switching operation from the state of feeding a roll of recording paper to the neutral state.
Figure 4B:
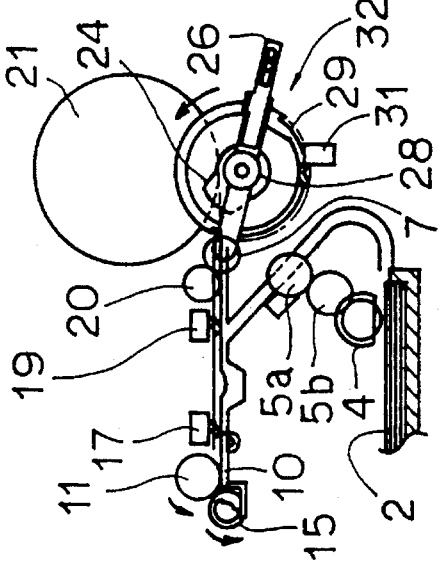

Referring to FIGS. 4A–4F, and 7, switching of the state from the state of feeding roll of recording paper to the neutral state can be performed by a single rotation of system gear 32 in the counterclockwise direction. As illustrated in FIG. 4A, a recording paper switching key is activated, and platen roller 11 is rotated counterclockwise at a rotating speed of about 400 pps. Thus, part of roll of recording paper 21 yields at recording paper storage 8. After rotating platen roller 11 for a prescribed amount, as illustrated in FIG. 4B, DC motor 23 is turned on to rotate worm gear 22 so that system gear 32 rotates in the counterclockwise direction. At that time, the rotation of system gear 32 rotates head releasing drive pulley 28, and head release cam 15 is rotated in response. Thus, pressure on printing head 10 is reduced or eliminated.

Figure 4C:
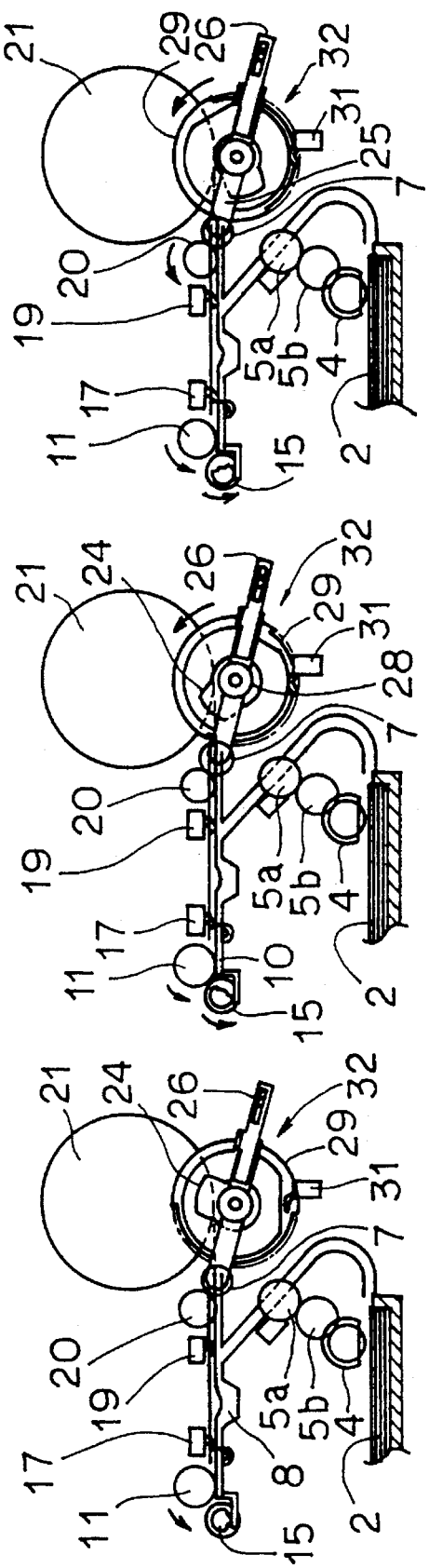

System gear 32 further rotates, and as illustrated in FIG. 4C, sun gear 29 comes to into engagement with planetary gear 7. Thus, planetary gear 7 rotates in the clockwise direction, and then roll conveying gear 20a (not shown) in engagement with planetary gear 7 rotates counterclockwise. Thus, roll of conveying roller 20 rotates counterclockwise, and roll of recording paper 21 in the conveying path is withdrawn. At that time, although force in the direction of counterclockwise rotation is effected upon planetary gear arm 25, the pivotal movement of planetary gear arm 25 is restricted by lock member 26 positioned on the side of system gear 32. Thus, planetary gear 7 continues to the roll conveying gear 20a.

Figure 4D:
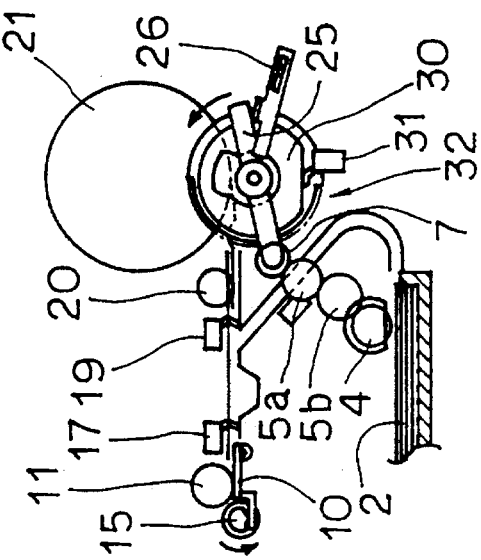

System gear 32 continues to rotate clockwise, and the roll of recording paper is gradually withdrawn as a result. As illustrated in FIG. 4D, A4 detection sensor 17, and roll of recording paper detection sensor 19 in turn attain an out of paper state (OFF state). Then, platen roller 11 stops rotating when A4 detection sensor 17 attains the out of paper state or after rotation for a fixed amount. Then, according to the rotation of system gear 32, lock member 26 is moved in the direction away from system gear 32 by the function of lock driving groove 24 integrated with system gear 32. This permits counterclockwise rotation of planetary gear arm 25. At that time, such adjustment that the leading end of the roll of recording paper comes between roll of recording paper detection sensor 19 and the roll conveying roller 20 by appropriately setting the diameters of sun gears 29 and the roll conveying roller 20 in system gear 32, and a speed reducing ratio from a sun gear 29 to the roll conveying roller 20.

Figure 4E:
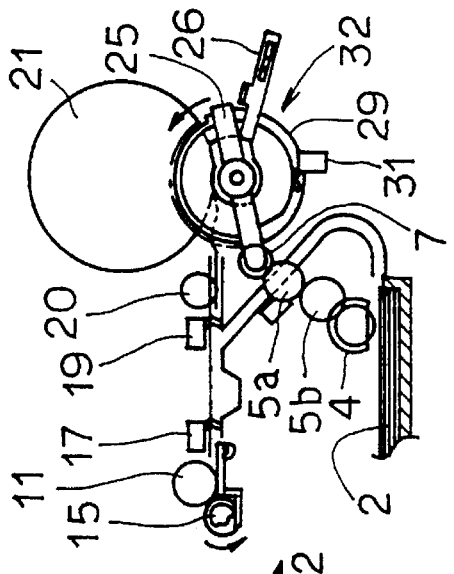

When planetary gear arm 25 is enabled to rotate counterclockwise, it do so immediately rotates, and as illustrated in FIG. 4E, planetary gear 7 becomes engaged with first idler gear 5a. However, sun gear 29 in system gear 32 has passed planetary gear 7, and therefore planetary gear 7 and sun gear 29 do not engage with each other. Accordingly, the driving force of system gear 32 is not transmitted to first idler gear 5a through planetary gear 7. Accordingly, sheet conveying roller 4 scarcely rotates.

Figure 4F:
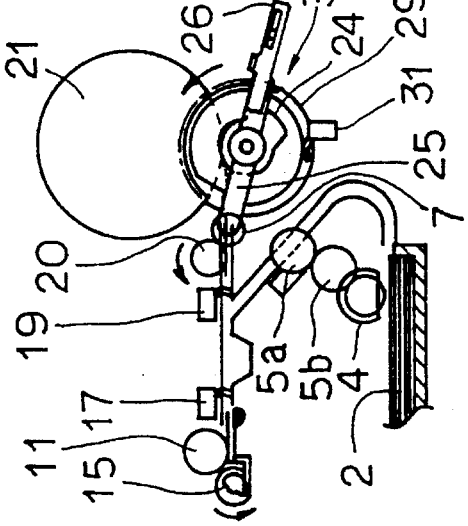

When system gear 32 makes just one rotation from the state shown in FIG. 4A, as illustrated in FIG. 4F, gear position detection sensor 31 detects the recess in gear position detection cam 30. Thus, gear position detection sensor 31 turns ON, at which point DC motor 23 is turns off. Thus, the rotation of system gear 32 stops. Head releasing cam 15 operating with system gear 32 stops rotating, and the original state shown in FIG. 4A is attached, in other words pressure to printing head 10 is reapplied.

As described above, one rotation of system gear 32 in the counterclockwise direction from the state of feeding roll of recording paper permits switching the state to the neutral state.

Figure 9:
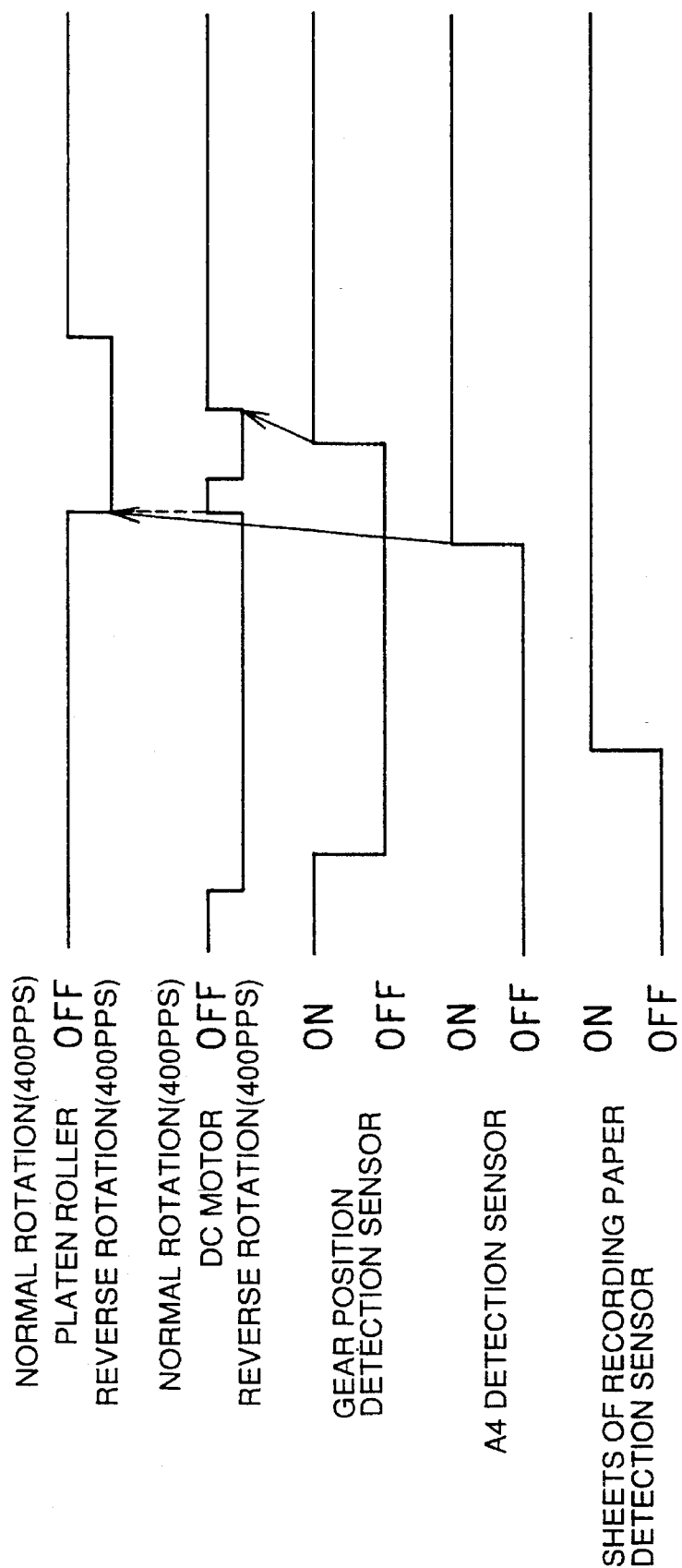
FIG. 9 is a timing chart for use in illustration of the switching operation shown in FIG. 5.

Referring to FIGS. 5A to 5F, the switching operation from the neutral state (FIG. 3B) to the state of feeding sheets of recording paper (FIG. 3C) will be described. FIGS. 5A–5F are views showing state by state the switching operation from the neutral state to the state of feeding sheets of recording paper. FIG. 9 is a timing chart for use in illustration the above-described switching operation.

An operation of feeding sheets of recording paper is performed by rotating system gear 32 in the counterclockwise direction from the neutral state (FIG. 3B). DC motor 23 is rotated reversely from the neutral state (FIG. 3A), which rotates system gear 32 in the counterclockwise direction. Thus, as illustrated in FIG. 5A, head release cam 15 rotates together with the rotation of system gear 32. Thus, pressure to printing head 10 is reduced.

Thereafter, system gear 32 further rotates, and sun gear 29 engages planetary gear 7. Thus, the rotation torque of system gear 32 is transmitted to sheets of recording paper conveying roller 4 through planetary gear 7, first idler gear 5a and second idler gear 6b. As illustrated in FIG. 5B, sheets of recording paper conveying roller 4 starts rotating as a result.

By the rotation of sheets of recording paper conveying roller 4, as illustrated in FIG. 5C, the sheets of recording paper 2 accommodated in recording paper cassette 3 are conveyed, and the presence/absence of sheets of recording paper 2 in the conveying path is detected by sheets of recording paper detection sensor 6 provided in the conveying path.

System gear 32 further rotates in the counterclockwise direction, and conveyance of sheets of recording paper is conducted. Thus, as illustrated in FIG. 5D, A4 detection sensor 17 provided in the downstream of sheets of recording paper detection sensor 6 in the recording paper conveying path turns ON, i.e., obtains a recording paper present state. At that time, as illustrated in FIG. 5D, the sheets of recording paper 2 has its leading end abutted upon the vicinity of the contacting surface between printing head 10 and platen roller 11, and attains a somewhat yielded state.

In response to this, as illustrated in FIG. 9, DC motor 23 is temporarily turned off, to temporarily stop the rotation of system gear 32. Then, as illustrated in FIG. 5E, platen roller 11 is rotated reversely at a speed of about 400 pps for a prescribed time period. Thus, the leading end of the recording paper reaches a prescribed position, and the yielding of the recording paper disappears. Meanwhile, system gear 32, as illustrated in FIG. 5F, once again rotates reversely during the rotation of platen roller 11, and conveyance of sheets of recording paper 2 is conducted. According to the rotation of system gear 32, the recess 30a of gear position detection cam 30 rotating integrally with system gear 32 is detected by gear position detection sensor 31. Gear position detection 31 turns OFF, in response to which DC motor 23 is turned off. At that time, head release cam 15 operating together with system gear 32 makes one rotation, and pressure on printing head 10 is reapplied.

As described above, one rotation of system gear 32 in the counterclockwise direction permits the state to be changed from the neutral state (FIG. 3B) to the state of feeding sheets of recording paper (FIG. 3C).

Figure 8:
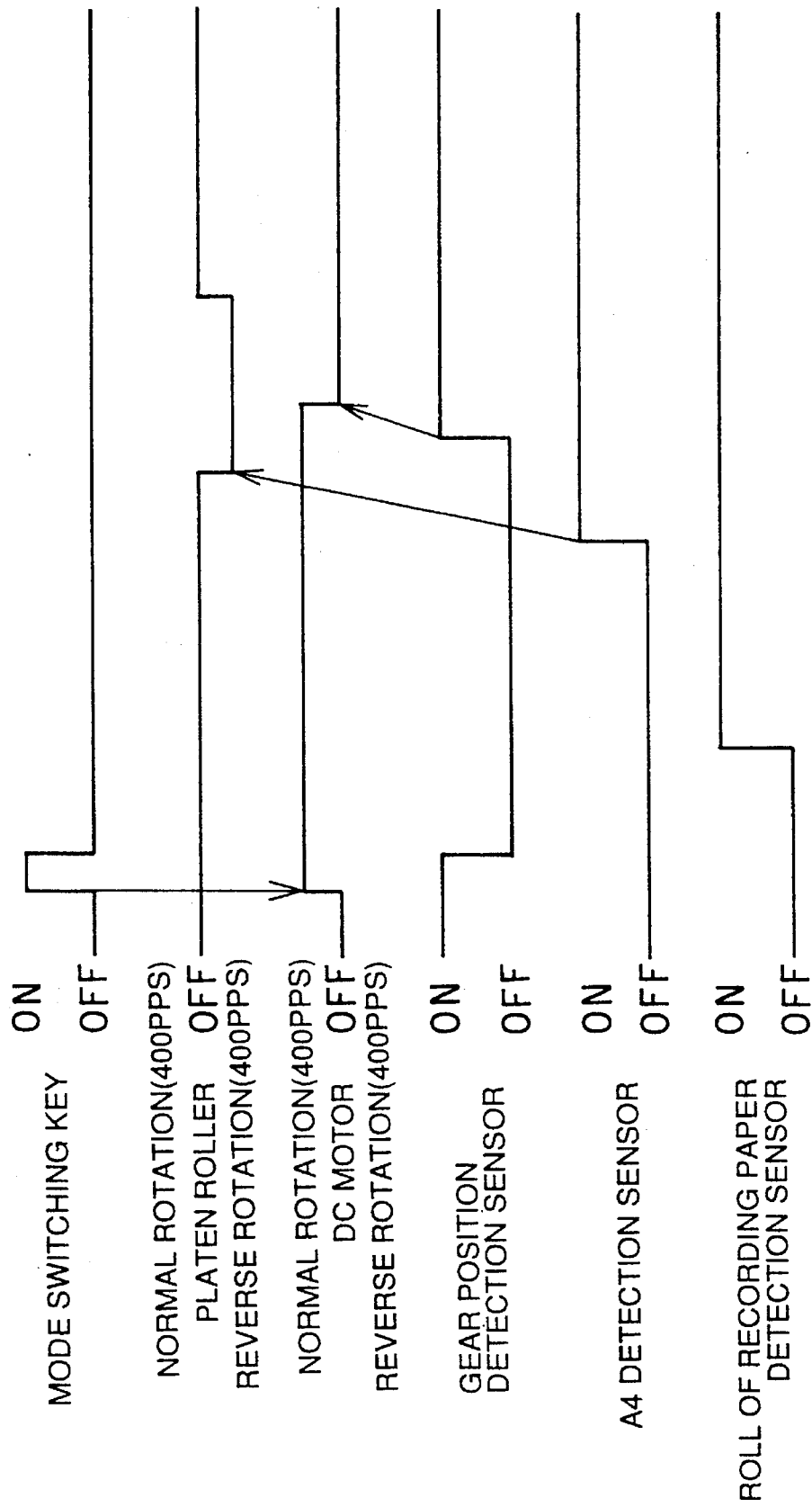
FIG. 8 is a timing chart for use in illustration of the switching operation shown in FIG. 6.

The switching operation from the neutral state (FIG. 3B) to the state of feeding roll of recording paper (FIG. 3A) will be described in conjunction with FIGS. 6A–6F. FIGS. 6A–6F are views showing step by step the switching operation from the neutral state (FIG. 3B) to the state of feeding roll of recording paper. FIG. 8 is a timing chart for use in illustration of the above-described switching operation.

The switching operation from the neutral state (FIG. 3B) to the state of feeding roll of recording paper (FIG. 3A) is performed by rotating system gear 32 once in the clockwise direction. As illustrated in FIG. 6A, rotating DC motor 23 in the counterclockwise direction at a rotating speed of about 400 pps permits rotation of system gear 32 in the clockwise direction. Thus, head release cam 15 operating together with system gear 32 rotates, thus reducing pressure upon printing head 10. Lock member 26 is moved in a direction away from system gear 32 by the lock driving groove 24 provided integrally with system gear 32. This permits planetary gear arms 25 fixed by lock member 26 to rotate freely.

When system gear 32 is further rotated clockwise from the above-described state, sun gear 29 in system gear 32 engages with planetary gear 7. At that time, since planetary gear arm 25 is not restricted by lock member 26, planetary gear arm 25 pivots in the clockwise direction by the force between the teeth of sun gear 29 and planetary gear 7. Accordingly, as illustrated in FIG. 6, planetary gear 7 engages with a roll paper conveying gear (not shown). Thus, the rotation torque of system gear 32 is transmitted to roll paper conveying roller 20 through planetary gear 7 and the roll paper conveying gear. Thus, the roll paper 21 is sent out to the side of platen roller 11.

When system gear 32 is further rotated, as illustrated in FIG. 6C, the leading end of the roll paper 21 passes the roll paper detection sensor 19 (roll paper detection sensor is turned on). Then, system gear 32 is further rotated, and as illustrated in FIG. 6D, the tip end of roll paper 21 reaches the A4 detection sensor 17. Thus, the A4 detection sensor 17 attains an ON state, in other words, a paper present state. After system gear 32 rotates for a fixed amount, it starts rotating platen roller 11 clockwise.

When system gear 32 is further rotated from the above-described state, as illustrated in FIG. 6E, sun gear 29 and planetary gear 7 do not engage with each other. More specifically, the roll of recording paper is no longer conveyed by roll paper conveying roller 20. However, since the leading end of the roll paper has already reached platen roller 11 by conveyance, the roll paper 21 is conveyed by platen roller 11. Platen roller 11 stops after rotating for a fixed amount as illustrated in FIG. 8.

System gear 32 further rotates counterclockwise, and as illustrated in FIG. 6F, gear position detection sensor 31 detects recess 30a in gear position detection cam 30 rotating integrally with system gear 32. More specifically, the initial position of system gear 32 is detected. Accordingly, DC motor 23 is turned off, thus stopping the rotation of system gear 32. When motor 23 is turned off, head release cam 15 operating together with system gear 32 make one rotation before stopping due to momentum/inertia, and pressure upon printing head 10 is regained.

Going through the above-described operations, supply of a roll of recording paper or sheets of recording paper is selected. Note that in the above-described first embodiment, one example of the switching mechanism has been described, the machine may have a switching mechanism with a structure different from the above. Any mechanism can be employed if it transmits driving force from a common source in supplying the two kinds of recording paper and has a gear mechanism for supplying the respective kinds of recording paper utilizing the transmitted force. Thus, the manufacturing cost and the size of the facsimile machine can be reduced. If it is equipped with means for determining the amount of received information, recording paper may be selected appropriately depending upon the amount of received information.

Figure 10:
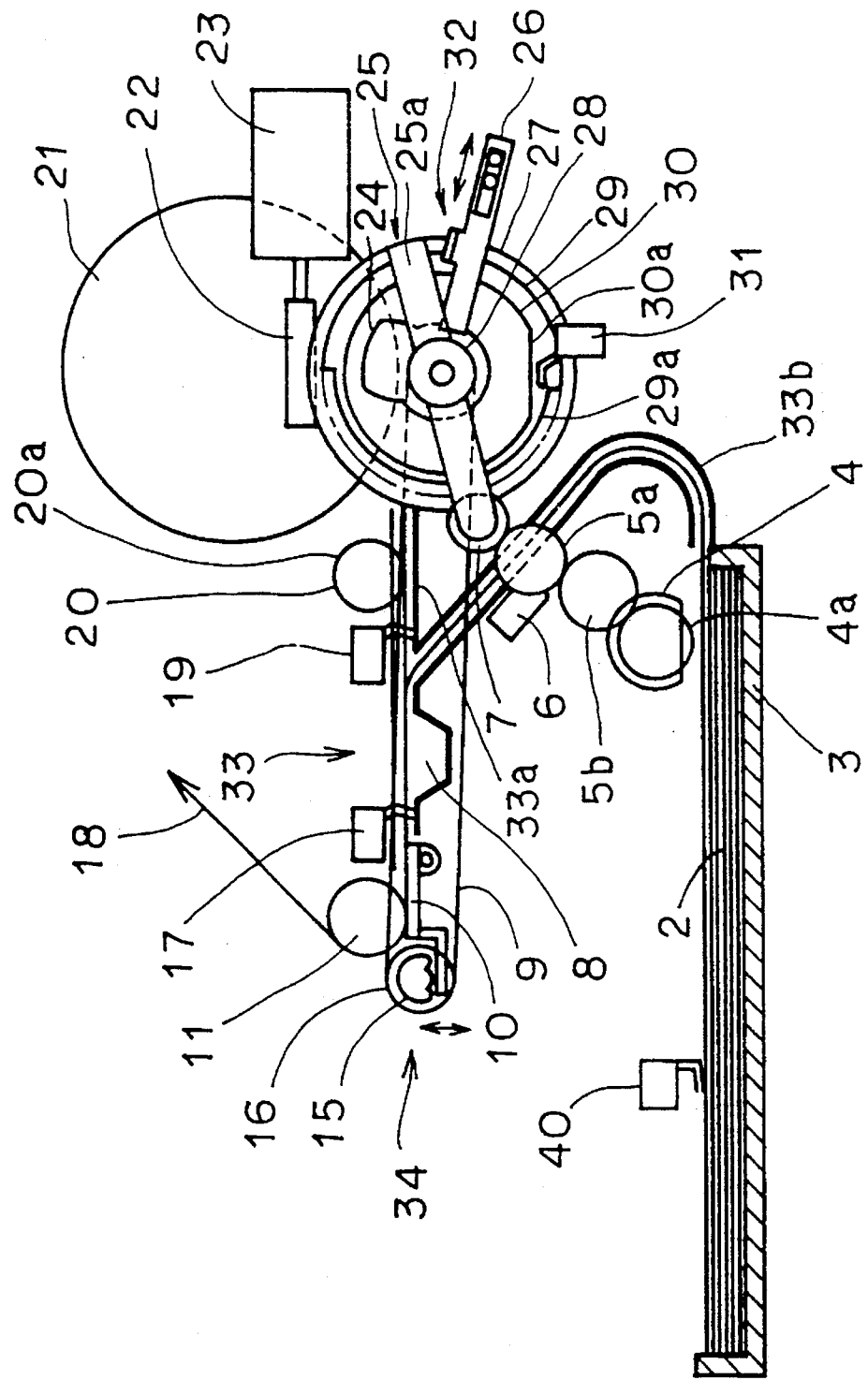
FIG. 10 is a view schematically showing the structure of a facsimile machine according to a second embodiment of the invention.
Figure 11:
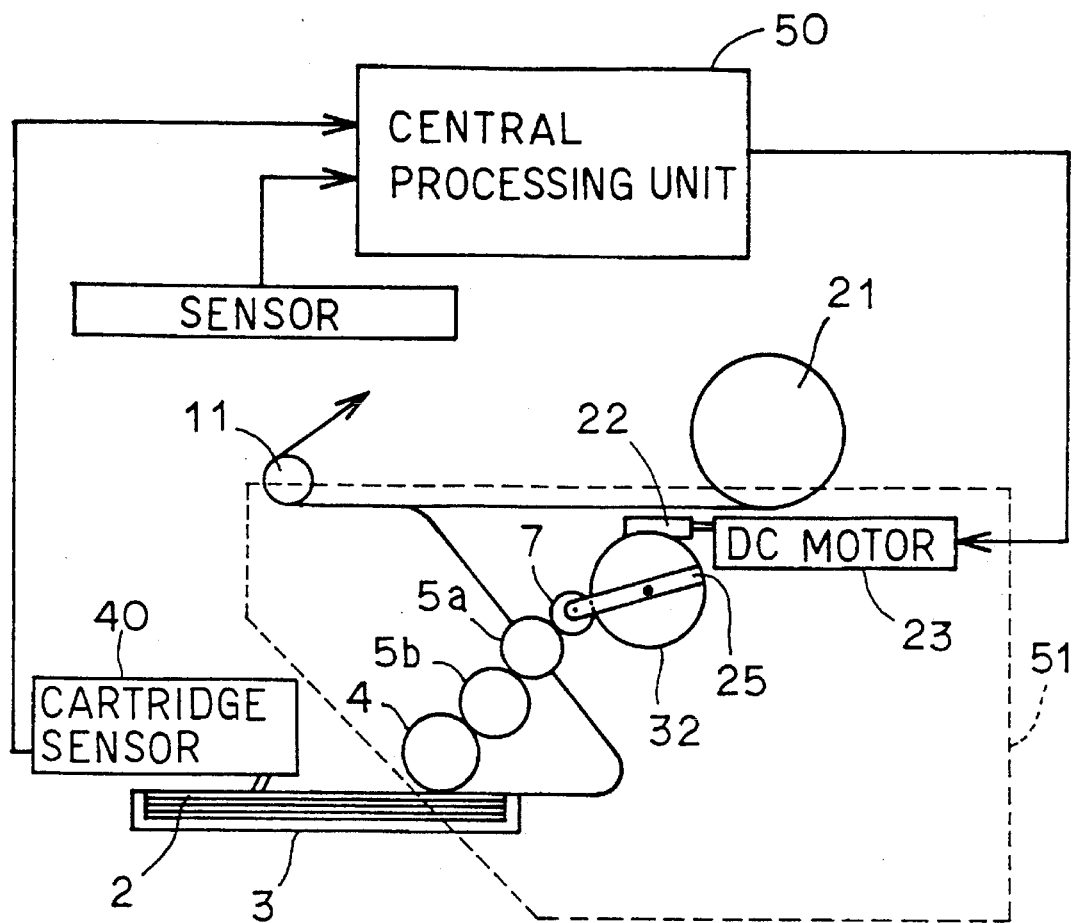
FIG. 11 is a block diagram schematically showing the characteristic portion of the facsimile machine according to the second embodiment of the invention.
Figure 12:
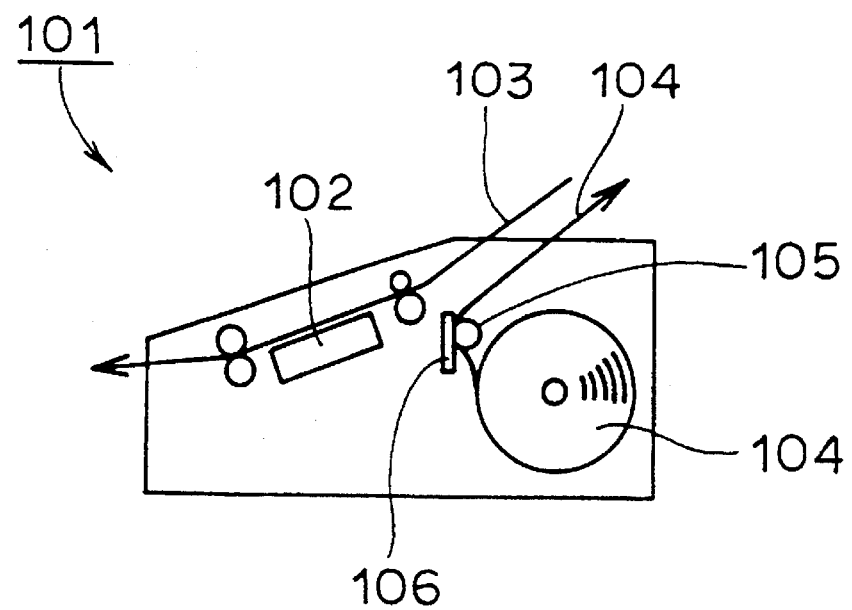
FIG. 12 is a view schematically showing the structure of one example of a conventional facsimile machine using only a roll of recording paper.
Figure 13:
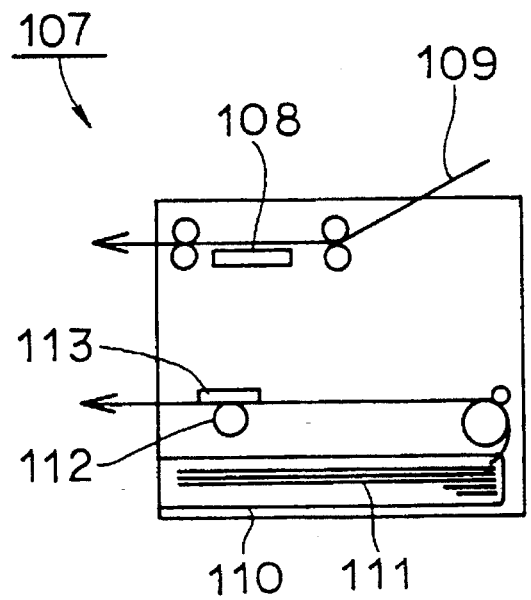
FIG. 13 is a view schematically showing the structure of one example of a conventional facsimile machine using only sheets of recording paper.
Figure 14:
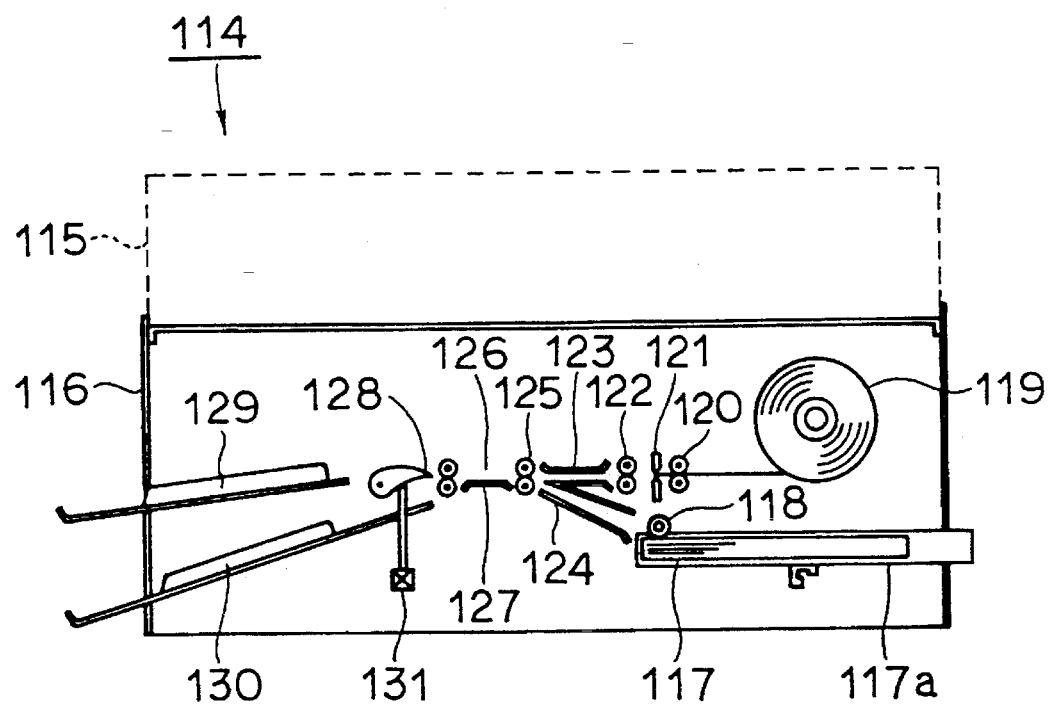
FIG. 14 is a view schematically showing the structure of one example of a conventional facsimile machine using a roll of recording paper and sheets of recording paper.

Now, referring to FIGS. 10 and 11, a second embodiment of the invention will be described. FIG. 10 is a view schematically showing the structure of a facsimile machine according to the second embodiment of the invention. FIG. 11 is a block diagram showing the structure of the facsimile machine according to the second embodiment of the invention.

Referring to FIG. 10, the facsimile machine according to the embodiment includes a cartridge sensor 40 in addition to the above-described switching mechanism. Cartridge sensor 40 as in the state shown in FIG. 10 is for detecting whether or not the sheets of recording paper 2 are left in recording paper cassette 3. The absence of sheets of recording paper 2 in recording paper cassette 3 is detected by cartridge sensor 40, and the roll of recording paper 21 can automatically be supplied to recording portion 34 by operating the switching mechanism. Thus, even if the sheets of recording paper 2 run out during recording of received information, the roll of recording paper 21 is automatically sent into recording portion 34. Consequently, interruption of recording operation by the lack of recording paper during recording of received information can be avoided.

In the embodiment shown in FIG. 10, a contacting type sensor having an actuator lever is used for the above-described cartridge sensor 40. However, the sensor may be of any type such as a reflective type sensor including a light emitter or a transmission type sensor provided with a light emitter at the bottom of recording paper cassette 3.

Now, the characteristic operation of the abovedescribed embodiment will be described in more detail in conjunction with FIG. 11. Referring to FIG. 11, cartridge sensor 40 is connected to a central processing unit 50. Central processing unit 50 is connected to DC motor 23 provided in a switching mechanism 51. When cartridge sensor 40 detects the absence of sheets of recording paper 2 in recording paper cassette 3, that information is sent to central processing unit 50. Central processing unit 50 controls the operation of DC motor 23, and operates switching mechanism 51.

More specifically, switching mechanism 51 is operated from the state of feeding sheets of recording paper 2 to the state of feeding roll of recording paper 21 by conducting the same switching operation as the above-described first embodiment. Thus, even if the sheets of recording paper 2 run out, recording can be continued using roll of recording paper 21. More specifically, even if one recording paper (sheets of recording paper) runs out, recording can be conducted onto the other recording paper (roll of recording paper) without interrupting the recording operation. As a result, reception failures such as interruption of recording operation due to the lack of recording paper can be avoided.

It is noted that in the above-described second embodiment, the roll of recording paper 21 can be supplied if the sheets of recording paper 2 run out. However, the invention is not limited to this, and the embodiment is applicable to the case in which the sheets of recording paper 2 are supplied in response to the detection of the lack of roll of recording paper 21.

Printing head 10 in each of the above-described embodiments may be a thermal head. Furthermore, the method of recording may be of laser recording type or of ink jet recording type.

According to the invention, supply of first recording paper or second recording paper can be selected as needed. Thus, if, for example, the amount of received information is small, sheets of recording paper can be selected as recording paper for the received information. More specifically, information can be recorded by selecting more suitable recording paper. In the recording apparatus according to the invention, a common power source can be used for operating the first and second paper feeding means. More specifically, driving force can be transmitted to the above-described first and second paper feeding means through the switching mechanism from the common power source. Thus, the manufacturing cost and size of the recording apparatus can be reduced.

The above-described switching mechanism includes the holding member control means. Therefore, a switching operation can be conducted by a simple mechanism. The mechanism is further provided with a cooperative operation means moving the recording head by operating in cooperation with the operation of the switching mechanism. Thus, pressure upon the recording head can be reduced in parallel with the switching operation, and damage due to abrasion of the recording head can be prevented. More specifically, the recording apparatus according to the invention can operate a switching operation in a simple mechanism and can also provide a highly reliable recording apparatus.

Furthermore, if equipped with a sensor for detecting whether or nor recording paper remaining in accommodation means for recording paper, even if a first kind of recording paper runs out during recording of received information, the sensor detects the absence of the first kind of recording paper to operate the switching mechanism, and a second kind of recording paper can automatically be supplied to the recording portion. Accordingly, interruption of the recording operation due to the lack of first kind of recording paper can be avoided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording apparatus, comprising:

a recording portion for recording an image on recording paper;

a first paper feeder for feeding individual sheets of recording paper to said recording portion;

a second paper feeder for feeding a substantially continuous roll of recording paper to said recording portion;

a common power drive for operating said sheet and roll paper feeders;

a switching mechanism for selectively transmitting a driving force from said power drive to said sheet paper feeder or said roll paper feeder wherein said first paper feeder includes a first driving force transmitted portion to which the driving force from said power drive is transmitted through said switching mechanism, said second paper feeder includes a second driving force transmitted portion to which the driving force from said power drive is transmitted through said switching mechanism, said switching mechanism includes a first gear to which the driving force from said power drive is transmitted, a second gear for selectively transmitting the driving force transmitted to said first gear to said first driving force transmitted portion or said second driving force transmitted portion, and a holding member holding said second gear pivotably at said first gear and pivoting according to the rotation of said first gear for moving said second gear to said first driving force transmitted portion or said second driving force transmitted portion, said first gear has a gear position detection cam for detecting the initial position of the rotation of the first gear.

2. A recording apparatus, comprising:

a recording portion for recording an image on recording paper;

a sheet paper feeder for feeding individual sheets of recording paper to said recording portion;

a roll paper feeder for feeding a substantially continuous roll of recording paper to said recording portion;

a single power drive for operating said sheet and roll paper feeders;

a switching mechanism for selectively transmitting a driving force from said single power drive to said sheet paper feeder or said roll paper feeder.

3. A recording apparatus as recited in claim 2, wherein said sheet paper feeder includes a first driving force transmitted portion to which the driving force from said single power drive is transmitted through said switching mechanism, said roll paper feeder includes a second driving force transmitted portion to which the driving force from said single power drive is transmitted through said switching mechanism, said switching mechanism includes a first gear to which the driving force from said single power drive is transmitted, a second gear for selectively transmitting the driving force transmitted to said first gear to said first driving force transmitted portion or said second driving force transmitted portion, and a holding member holding said second gear pivotably at said first gear and pivoting according to the rotation of said first gear for moving said second gear to said first driving force transmitted portion or said second driving force transmitted portion.

4. A recording apparatus as recited in claim 3, wherein said first driving force transmitted portion includes a conveying roller for conveying the first recording paper, said second driving force transmitted portion includes a conveying roller for conveying the second recording paper, said first gear includes a sun gear rotating according to the rotation of said first gear, and said second gear is a planetary gear engaged with said sun gear.

5. A recording apparatus as recited in claim 4, wherein in the circumference of said sun gear, a substantially circular portion without teeth is provided.

6. A recording apparatus comprising:

a recording portion having a recording head for recording an image on recording paper;

a first paper feeder for feeding first recording paper to said recording portion;

a second paper feeder for feeding second recording paper to said recording portion;

a common power source for operating said first and second paper feeders;

a first gear for transmitting driving force from said power source;

a second gear selectively transmitting the driving force transmitted to said first gear to said first paper feeder or said second paper feeder;

a holding member for holding said second gear pivotably at said first gear; and a cooperative operation mechanism coupled to said first gear for moving said recording head when the driving force is being switched between said first and second paper feeders.

7. A recording apparatus as recited in claim 6, wherein said cooperative operation mechanism includes, a first pulley provided coaxially with said first gear for rotating according to the rotation of said first gear;

a second pulley provided at said recording portion, a head release cam provided in contact with a surface of said recording head for displacing said recording head by rotating according to the rotation of said second pulley, and a belt for coupling said first and second pulleys.

8. A recording apparatus, comprising:

a recording portion for recording an image on recording paper;

sheet paper feeding means for feeding individual sheets of recording paper to said recording portion;

roll paper feeding means for feeding paper from a roll of recording paper to said recording portion;

a single power drive for operating said first and second paper feeding means;

a first gear for transmitting driving force from said power drive;

a second gear for selectively transmitting the driving force transmitted to said first gear to said sheet paper feeding means or said roll paper feeding means;

a holding member attached to said first gear for holding said second gear pivotably at said first gear; and a holding member control means for fixing said holding member and said second gear to a first position for transmitting driving force to said sheet paper feeding means or to a second position for transmitting driving force to said roll paper feeding means.

9. A recording apparatus as recited in claim 8, wherein said holding member control means has a pivotal movement control member including a projection for engaging said holding member, thereby restricting the pivotal movement of said holding member.

10. A recording apparatus, comprising:

a recording portion for recording an image on recording paper;

first paper feeding means for feeding individual sheets of recording paper to said recording portion;

second paper feeding means for feeding paper from a roll of recording paper to said recording portion;

a power drive for operating said first and second paper feeding means;

a first gear for transmitting driving force from said power drive;

a second gear for selectively transmitting the driving force transmitted to said first gear to said sheet paper feeding means or said roll paper feeding means;

a holding member attached to said first gear for holding said second gear pivotably at said first gear; and a holding member control means for fixing said holding member and said second gear to a first position for transmitting driving force to said first paper feeding means or to a second position for transmitting driving force to said second paper feeding means, said holding member control means has a pivotal movement control member including a projection for engaging said holding member, thereby restricting the pivotal movement of said holding member, wherein a groove for receiving said pivotal movement control member is formed at said first gear, a raised portion is provided on the bottom of said groove at a prescribed position, said pivotal movement control member is so disposed that part of the surface of said pivotal movement control member is in contact with the bottom of said groove, and said projection is provided to extend in a direction crossing the upper surface of said holding member on the side of the surface of said pivotal movement control member in contact with the bottom of said groove.

11. A recording apparatus, comprising:

first accommodation means for accommodating individual sheets of recording paper;

second accommodation means for accommodating roll of recording paper;

a recording portion for recording an image on recording paper;

sheet paper feeding means for taking out sheets of recording paper from said first accommodation means and feeding the sheets of paper to said recording portion;

roll paper feeding means for taking out roll recording paper from said roll of recording paper in said second accommodation means and feeding the roll paper to said recording portion;

a single motor for driving said first and second paper feeding means;

switching means for selectively transmitting the driving force from said single motor to said sheet paper feeding means or said roll paper feeding means;

a sensor for detecting whether said roll recording paper remains in said second accommodation means; and control means for controlling said switching mechanism, in response to a detection of the absence of roll recording paper in said second accommodation means by said sensor, so that the driving force from said single motor is transmitted to said sheet paper feeding means.

12. A recording apparatus as recited in claim 11, wherein said control means has a central processing unit, and said central processing unit is connected to said sensor and said power source to control the operation of said power source based on detection information by said sensor.

* * * * *